US007222099B2

(12) United States Patent
Forsythe et al.

(10) Patent No.: US 7,222,099 B2
(45) Date of Patent: May 22, 2007

(54) METHOD AND SYSTEM FOR SELECTING AND PURCHASING MEDIA ADVERTISING

(76) Inventors: Charles Bradley Forsythe, 6363 Woodway, Suite 300, Houston, TX (US) 77057; Laura Forsythe, 6363 Woodway, Suite 300, Houston, TX (US) 77057

( * ) Notice: Subject to any disclaimer, the term of this patent is extended or adjusted under 35 U.S.C. 154(b) by 0 days.

(21) Appl. No.: 11/098,649

(22) Filed: Apr. 4, 2005

(65) Prior Publication Data

US 2005/0171897 A1    Aug. 4, 2005

Related U.S. Application Data

(63) Continuation of application No. 09/650,299, filed on Aug. 29, 2000, now Pat. No. 6,937,996.

(51) Int. Cl.
G06Q 40/00 (2006.01)
(52) U.S. Cl. .......................................... 705/40; 705/14
(58) Field of Classification Search .................. 705/40, 705/14
See application file for complete search history.

(56) References Cited

U.S. PATENT DOCUMENTS 6,173,271 B1 * 1/2001 Goodman et al. ............ 705/40

FOREIGN PATENT DOCUMENTS

JP    404043492 A  *  2/1992

OTHER PUBLICATIONS

Hardcopy of website for COREMedia Systems, Inc.; Dec. 15, 2000.
Hardcopy of website for Telmar Worldwide; Jun. 30, 2000.
Hardcopy of website for BuyMedia.com; May 29, 2000.
Hardcopy of website for AdOutlet.com; Jun. 29, 2000.
Hardcopy of website for broadcastspots.com; Jun. 29, 2000.
Hardcopy of website for OneMediaPlace; Jun. 29, 2000.
Brochure for SmartPlus, a service of Marketing Resources Plus.
Hardcopy of website for Strata Software; Jun. 30, 2000.
Hardcopy of website for Squad.com; Jun. 30, 2000.
Hardcopy of website for Squad.com's SPARC FAQ; Jun. 30, 2000.
Hardcopy of website for Arbitron Media Software; Jun. 13, 2000.
Tapscan 2000 brochure page.
Scarborough research brochure.

* cited by examiner

Primary Examiner—Pierre Eddy Elisca
(74) Attorney, Agent, or Firm—Fulbright & Jaworski L.L.P.

(57) ABSTRACT

The subject invention is directed to a method and system for selecting and purchasing media advertising in a user/server environment accessed through a Web site. The method includes accessing a server system through a Web site by an advertiser in which the advertiser provides information relating to buying criteria and customer data through a form on the Web page in order to select and purchase media advertising. The server system receives and processes the information in order to create at least one media advertising rate request. The server system transmits the rate request to at least one media outlet for processing. The media outlet processes the rate request and transmits the processed rate request to the server system. The server system manipulates the processed rate request to create a media advertising schedule and then transmits the advertising schedule to the advertiser. The advertiser receives the schedule, makes a media advertising purchase decision and transmits the purchase decision back to the server system. Thereafter, the server system transmits the media advertising purchase decision to the media outlet for reserving the purchased advertising.

15 Claims, 12 Drawing Sheets

Fig. 6

132 — Each Schedule's Cost per Point Level is Matched with the Market Average

134 — The Difference is Converted to a % of Variance

136 — % of Variance is Assigned a Numerical Rating & Applied to each Schedule

138 — Numerical Rating Categorized:
Poor Efficiency
Good Efficiency
Excellent Efficiency

140 — Attach Simplified Rating System Bar to Each Schedule

FIG. __8 A__

SMART FORM

COMPANY NAME: _____

BILLING ADDRESS:

_____

COMPANY CONTACT:

_____

PHONE_____ EMAIL_____ FAX_____

CAMPAIGN NAME: _____

(DROP DOWN MENUS)    PRODUCT OR SERVICE CATEGORY

☐ Automotive      ☐ Pet Supplies

☐ Banking/Financial      ☐ Restaurant/Fast Food

☐ eCommerce      ☐ Sporting Goods

☐ Home Improvement      ☐ Telecommunications

☐ Housewares      ☐ Toys

☐ Insurance      ☐ Women's Clothing

☐ Other _____

HOW OFTEN IS YOUR PRODUCT/SERVICE PURCHASED?

☐ Daily   ☐ Weekly   ☐ Monthly   ☐ 1-2 Times per Year   ☐ Every 2 Years or More

HOW MUCH COMPETITION DO YOU HAVE FOR YOUR PRODUCT/SERVICE IN YOUR MARKET AREA?

☐ Many Competitors   ☐ Few Competitors   ☐ No Competition

FIG. ___8 B___

WHAT IS THE PURPOSE OF YOUR ADVERTISING?

☐ Brand Building/Name Awareness  ☐ Sales Event  ☐ Direct Response

WHAT OTHER MEDIA ARE YOU CURRENTLY USING BESIDES TV/CABLE/RADIO?

☐ Newspaper  ☐ Magazine  ☐ Radio  ☐ Television  ☐ Outdoor  ☐ Internet  ☐ None

YOUR CUSTOMER PROFILE (Check all boxes that apply)

AGE:            Teens ☐   25-34 ☐   45-54 ☐   18-24 ☐   35-44 ☐   55+ ☐

GENDER:         Male ☐        Female ☐      Both ☐

AVG. ANNUAL INCOME:  $25,000 & Under ☐   $65,000-$90,000 ☐

$25,000-$40,000 ☐   $90,000-$125,000 ☐

$40,000-$65,000 ☐   Over $125,000 ☐

QUALITATIVE :   Additional information to describe your customer:

Race        White ☐  African American ☐  Hispanic ☐  Asian ☐  Other ☐

Education   High School ☐  College ☐  Advanced Degree ☐

Occupation  Professional ☐  Clerical ☐  Blue Collar ☐  Retired ☐  Student ☐

Other ☐ _____

Residence   Own ☐  Rent ☐  House ☐  Apartment/Townhouse ☐

SCHEDULING      Start Date: _____(Month/Day/Year)

End Date: _____ (Month/Day/Year)

FIG. ___8 C___

(DROP DOWN MENU)

TV/CABLE

| SELECT DAYPARTS | SELECT DAYS |
|---|---|
| ☐ All Dayparts | Mon☐ Tues☐ Wed☐ Thur☐ Fri☐ Sat☐ Sun☐ |
| ☐ Early Morning (7am-9am) | Mon☐ Tues☐ Wed☐ Thur☐ Fri☐ Sat☐ Sun☐ |
| ☐ Daytime (9am-4pm) | Mon☐ Tues☐ Wed☐ Thur☐ Fri☐ Sat☐ Sun☐ |
| ☐ Early Fringe (4pm-6pm) | Mon☐ Tues☐ Wed☐ Thur☐ Fri☐ Sat☐ Sun☐ |
| ☐ Prime Access (6pm-7pm) | Mon☐ Tues☐ Wed☐ Thur☐ Fri☐ Sat☐ Sun☐ |
| ☐ Prime Time (7pm-10pm) | Mon☐ Tues☐ Wed☐ Thur☐ Fri☐ Sat☐ Sun☐ |
| ☐ Late Access (10pm-10:30pm) | Mon☐ Tues☐ Wed☐ Thur☐ Fri☐ Sat☐ Sun☐ |
| ☐ Late Fringe (10:30pm-12m) | Mon☐ Tues☐ Wed☐ Thur☐ Fri☐ Sat☐ Sun☐ |
| ☐ Other_____ | Mon☐ Tues☐ Wed☐ Thur☐ Fri☐ Sat☐ Sun☐ |
| ☐ Other_____ | Mon☐ Tues☐ Wed☐ Thur☐ Fri☐ Sat☐ Sun☐ |

RADIO

| SELECT DAYPARTS | SELECT DAYS |
|---|---|
| ☐ All Dayparts | Mon☐ Tues☐ Wed☐ Thur☐ Fri☐ Sat☐ Sun☐ |
| ☐ Morning Drive (6am-10am) | Mon☐ Tues☐ Wed☐ Thur☐ Fri☐ Sat☐ Sun☐ |
| ☐ Mid-Day (10am-3pm) | Mon☐ Tues☐ Wed☐ Thur☐ Fri☐ Sat☐ Sun☐ |
| ☐ Afternoon Drive (3pm-7pm) | Mon☐ Tues☐ Wed☐ Thur☐ Fri☐ Sat☐ Sun☐ |
| ☐ Evening (7pm-12m) | Mon☐ Tues☐ Wed☐ Thur☐ Fri☐ Sat☐ Sun☐ |
| ☐ Prime Rotator (6am-7pm) | Mon☐ Tues☐ Wed☐ Thur☐ Fri☐ Sat☐ Sun☐ |
| ☐ Broad Rotator (6am-12m) | Mon☐ Tues☐ Wed☐ Thur☐ Fri☐ Sat☐ Sun☐ |
| ☐ Overnight (12am-12am) | Mon☐ Tues☐ Wed☐ Thur☐ Fri☐ Sat☐ Sun☐ |
| ☐ Other_____ | Mon☐ Tues☐ Wed☐ Thur☐ Fri☐ Sat☐ Sun☐ |
| ☐ Other_____ | Mon☐ Tues☐ Wed☐ Thur☐ Fri☐ Sat☐ Sun☐ |

FIG. 8D

LENGTH OF SPOT   :60 ☐   :30 ☐   :15 ☐   :10 ☐

GEOGRAPHIC   ☐ Marketwide Coverage   ☐ W. Houston   ☐ Baytown   ☐ Kingwood

☐ NW Houston   ☐ Clear Lake   ☐ Ft. Bend

NETWORKS/STATIONS   Rates For All Programs and Networks/Stations Meeting Your Buying Criteria Will Be Requested. If There Are Any Networks/Stations You Do Not Want Us to Request Rates For, Please Check Below:

(DROP DOWN MENU)

| Cable | TV | Radio |
|---|---|---|
| ☐ A&E | ☐ Sports | ☐ KAAA |
| ☐ CNN | ☐ Soap Opera | ☐ KCCC |
| ☐ Comedy Channel | ☐ Daytime Talk Show | ☐ KDDD |
| ☐ ESPN | ☐ Prime Time Drama | ☐ KEEE |
| ☐ Fox Family Channel | ☐ Comedy | ☐ KFFF |
| ☐ Headline News | ☐ Other _____ | ☐ KZZZ |
| ☐ Lifetime | ☐ Other _____ | |
| ☐ TBS | | |
| ☐ USA | | |

BUDGET   Please identify the total dollars allocated for above time period:
$ _____

TO CONTACT US FOR ASSISTANCE:
CUSTOMERHELP@FREEADSERVICE.COM

1-800-000-000

SUBMIT REQUEST ☐                CLEAR REQUEST ☐

METHOD AND SYSTEM FOR SELECTING AND PURCHASING MEDIA ADVERTISING

FIELD OF THE INVENTION

The present invention relates generally to a computer method and system for selecting and purchasing media advertising and more particularly to a method and system for selecting and purchasing media advertising through a user/server environment accessed through a Web site.

BACKGROUND OF THE INVENTION

Traditional media outlets, such as newspaper, outdoor and broadcast media such as radio, television and cable stations/networks, have a system for selling advertising space and time to purchasers. These purchasers are generally separated into two distinct media purchaser categories, advertising agencies and direct advertisers. In terms of pricing, advertising space is traditionally offered to advertising agencies at a discount and to direct advertisers at no discount. Additionally, this also reduces costs for the advertising agencies because they have the ability to negotiate for advertising space or time from the advantage of having an analytical process for evaluating the value and efficiencies of the media being purchased. Particularly for broadcast media advertising, the direct advertiser lacks an understanding of the price/value considerations necessary to negotiate a lower pricing level for the purchase of advertising media. As a result, direct advertisers generally incur higher unit costs for their advertising space and time than the advertising agencies.

Although media outlets typically have access to analytical data to evaluate the efficiencies of their advertising, for example the cost-per-spot, it is not advantageous to disclose this information to the general public because it would lead the direct advertiser to competitors with better, more efficient rates. More importantly however, is the fact that the direct advertiser lacks full comprehension of such data.

Currently, an advertiser that does not use the professional services of an advertising agency, e.g. a direct advertiser, is left to its own judgment about media selection, negotiating and buying the advertising, and the creative execution for each advertising dollar. Evaluating media selection and assessing rates and proper spending levels, while participating in creative commercial development, can be an awesome task for the direct advertiser. When a direct advertiser contacts any of the above-described media outlet choices, many factors will influence the form of media they choose for advertising their business. Direct advertisers will not know whether they have made the right local media outlet choices or have scheduled an adequate frequency of advertising messages. They will also not know if the advertising rates they paid were too high or if the total time commitment was too much or not enough. Few of these direct advertisers are qualified to effectively evaluate media selection and its cost or to develop properly crafted commercial messages.

When an advertising agency is involved in the traditional media-buying process, the advertising agency contacts the media outlet to request rate(s) or rate(s) with schedule(s) for one or more particular media advertising choices (newspaper, outdoor, TV, cable, radio or any combination of these). The selected media outlet sends the rate(s) or rate(s) with schedule(s) to the advertising agency which then negotiates with the media outlet for better rate(s). The advertising agency sends a second request, based on the new negotiated rate(s), to the media outlet which then sends adjusted rate(s) and schedule(s), based on the new (second) request, back to the advertising agency. After the advertising agency receives the adjusted rate(s) and schedule(s) from the media outlet and gets its client's approval, the advertisement(s) is placed with the media outlet by the advertising agency.

If a direct advertiser is involved in the media-buying process, the advertiser contacts the media outlet directly, which sends a salesperson to meet with the advertiser. After the salesperson has received information relating to the direct advertiser's needs, he/she returns to the media outlet with a request for rate(s) and schedule(s). The salesperson returns to the advertiser's office to present rate(s) and schedule(s) prepared by the media outlet. These rate(s) and schedule(s) can be negotiated a number of times or not at all before the salesperson turns in an advertising order to the media outlet.

Advertising agencies typically use a number of media software programs for analyzing the pricing and effectiveness of broadcast media advertising. A known radio analysis software program is TAPSCAN® that uses various databases in order to evaluate and generate scheduling and posting options. TAPSCAN's reports can include prebuy research including frequency-based tables, cost-per-point analysis, hour-by-hour and trending; scheduling adjustments for local and national consumer data, automatic scheduling and goal tracking, and optimal scheduling of day parts. A known analysis software program for the television and cable market is TVSCAN® that produces similar reports for the television and cable market. Another software program, available from Scarborough Research, provides qualitative data relating to media usage, retail shopping, demographics, lifestyle activities, and other consumer behaviors for sixty six local markets. Other media buying software is available from SMARTPLUS™, Strata Software, COREMedia Systems, Inc., Telmar, and SQAD™ for television and SPARC$^{SM}$ for radio, which both provide cost per point data by market.

Since the proliferation of Internet based companies, a number of web-based advertising or media-buying service companies have become available. These companies can be classified into three separate groups. One group provides content-related Web sites that provide updated listings of broadcast stations, newspapers and magazines and their contact information A second group consists of the Web sites of traditional advertising agencies and media-buying services that serve primarily as an online brochure for these companies. A third group consists of online media brokerage, consignment and exchange services that attempt to bring media buyers and sellers together via the Internet, thereby adding another layer between the buyer and seller. This third group is specifically directed to advertising agencies and media buying firms.

One example of an online media buying company is AdOutlet.com that uses an inventory replenishment system that posts a limited number of print and broadcast inventory on its site. Once the inventory is sold to the highest bidder, AdOutlet.com posts another set of available media inventory and the process is repeated. Another web-based company is OneMediaPlace.com that allows buyers to either purchase or bid on available media from a limited number of participating sellers. The inventory is sold on consignment through an auction process as well as set-price purchases. Most of the inventory on this site comes from online suppliers rather than traditional media outlets. OneMediaPlace also offers a platform in which buyers submit requests for proposals for broadcast media advertising and the site matches the requests with participating sellers.

Another web-based company, BuyMedia.com, serves primarily as a broker/fax service between agency buyers and broadcast media outlets. This site provides open-ended transactions between buyers and sellers in which a broadcast media purchase is negotiated and finalized between the buyers and the sellers. BroadcastSpots.com is an online media service that offers unsold broadcast inventory to media buyers at discounted rates. BroadcastSpots.com serves as a catalog by posting remnant media inventory and rates for buyers. BroadcastSpots.com also has a system that forwards a buyer's request for proposal to the broadcast media outlets that is similar to the service provided by OneMediaPlace.com.

It would be advantageous to provide direct advertisers with a method and system for selecting and purchasing traditional media advertising over the Internet. It would also be advantageous to provide a system in which direct advertisers can access technical and analytical data that has been converted to a simplified rating system thus allowing them to make independent, accurate and informed decisions about their media purchases.

It would be further advantageous to provide a system that reduces the time required for the media buying process, that expands the advertiser's media outlet choices, improves scheduling options, and streamlines the complete transaction between media outlet and advertiser.

SUMMARY OF THE INVENTION

The subject invention is directed to a method and system for selecting and purchasing media advertising in a user/server environment accessed through a Web site. The method includes accessing a server system through a Web site by an advertiser in which the advertiser provides information relating to buying criteria and customer data through a form on the Web page in order to select and purchase media advertising. The server system receives and processes the information in order to create at least one media advertising rate request. The server system transmits the rate request to at least one media outlet for processing. The media outlet processes the rate request and transmits the processed rate request to the server system. The server system manipulates the processed rate request to create a media advertising schedule and then transmits the advertising schedule to the advertiser. The advertiser receives the schedule, makes a media advertising purchase decision and transmits the purchase decision back to the server system. Thereafter, the server system transmits the media advertising purchase decision to the media outlet for reserving the purchased advertising.

BRIEF DESCRIPTION OF THE DRAWINGS

The invention will become more apparent when the detailed description of the exemplary embodiments is considered in conjunction with the appended drawings in which:

FIG. 6 is a flow diagram illustrating the routine for the rating system;

FIGS. 8A–8D illustrates a Smart Form for use with the subject invention; and

DETAILED DESCRIPTION OF THE INVENTION

In order to more fully understand the subject invention, below is a list of definitions that are used in the media advertising industry. A glossary of terms and abbreviation for television is as follows:

Frequency—the average number of times a household or a person viewed a given television program, station or commercial during a specific time period. Frequency is calculated by dividing the GRPs by the Reach Rating (RTG)—the estimate of the size of a television audience relative to the total universe, expressed as a percentage. Rating is calculated by the number of households viewing a certain channel divided by the total TV households.

Reach (Cume)—the number of different or unduplicated households or persons that are exposed to a television program or commercial at least once during the average week for a reported time period.

Share—the percentage of households using television (HUT) or persons using television (PUT) which are tuned to a specific program or station at a specific time. Households using television is calculated by the number of households using TV divided by the total number of TV households. Share is determined by the households viewing a certain channel divided by households using TV.

A glossary of terms and abbreviation for radio is as follows:

Average Quarter-Hour (AQH) Persons—the average number of persons listening to a particular station for at least five minutes during a 15-minute period.

Average Quarter-Hour (AQH) Rating—the AQH Persons estimate expressed as a percentage of the population being measured and calculated by dividing the AQH Persons by the population multiplied by a hundred.

Cost Per Point—the cost of achieving a number of impressions equivalent to one percent of the population in a given demographic group and is calculated by dividing the cost of schedule by the gross rating points. Cost for point is also the average cost of one GRP in a given schedule.

Daypart—a part of the day recognized by the industry to identify time periods of radio listening, e.g., Saturday—6:00 a.m.–10:00 a.m. or Monday-Friday 7:00 p.m-Mid.

Frequency—the average number of times a person is exposed to a radio spot schedule and is calculated by dividing the gross impressions by the net reach. or by dividing the Gross Rating Points by the Reach of schedule (Rating).

Gross Rating Points (GRPs)—the total number of rating points achieved for a particular spot schedule and is determined by multiplying the number of AQH persons times the number of spots in an advertising schedule divided by the population or multiplying the AQH rating times the number of spots in an advertising schedule.

Reach—identifies the estimated number of different people reached by a schedule. It is the unduplicated audience a station delivers. Reach can be expressed either as different persons or as rating.

Figure 1:
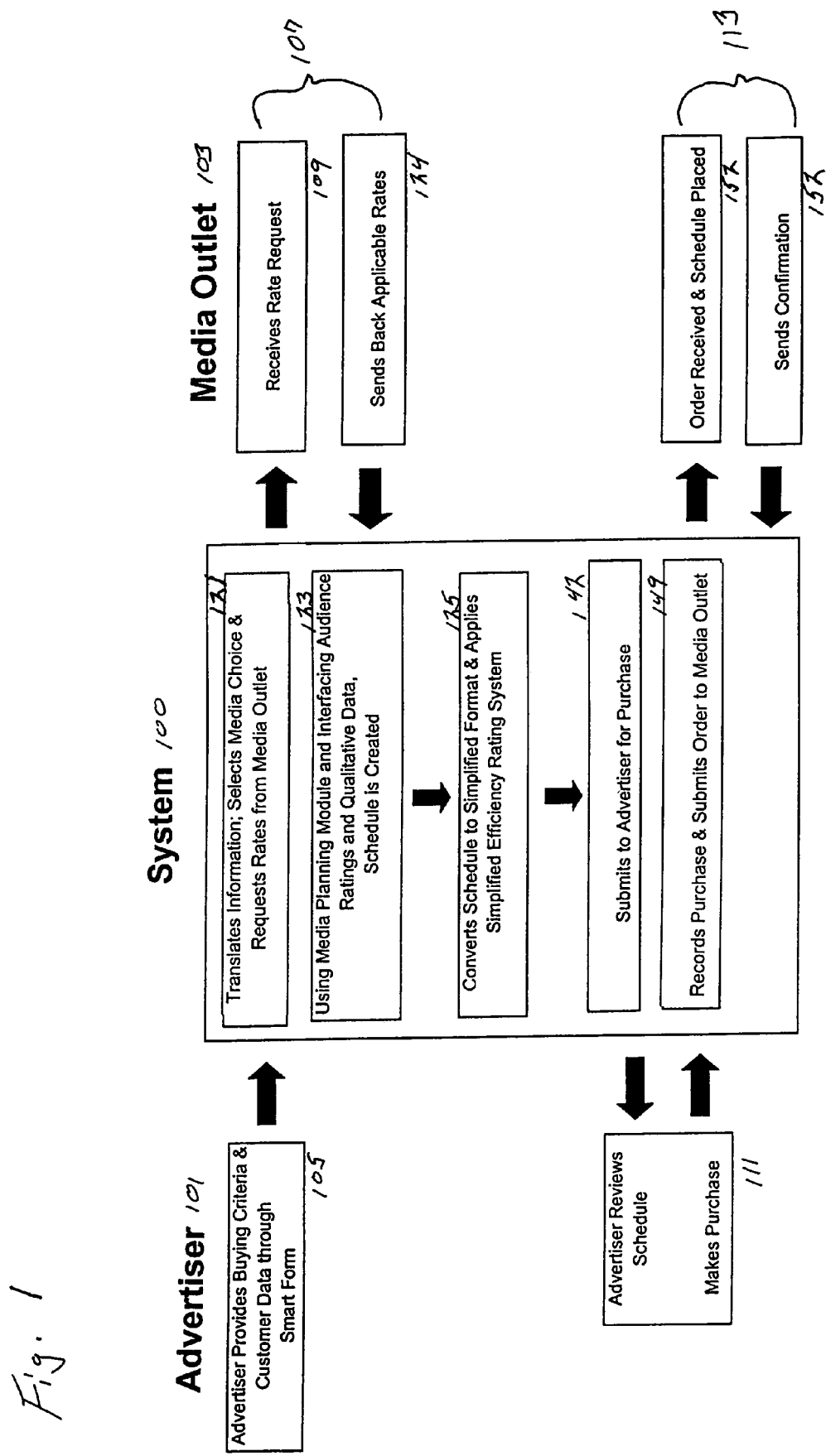
FIG. 1 is a flow diagram illustrating the system for selecting and purchasing media advertising of the present invention.

The subject invention is directed to a method and system for selecting and purchasing media advertising in a client/server environment accessed through a Web site as illustrated in FIG. 1. The media advertising selection and purchasing method and system, the "System" 100, interfaces small to medium size business advertisers 101 with media outlets 103 in order to streamline the process of purchasing media advertising. Information is transmitted between a client or user system, e.g. an advertiser (direct advertiser or advertising agency) and a media outlet, and a server system. The server system contains the System 100 that embodies the present invention and the user system accesses the server System 100 through a Web site. The invention also provides a method by which direct advertisers can access technical and analytical data that has been converted to a simplified rating system. The System uses statistics from third party data providers in the generation of data analysis and schedules that will assist the advertisers in their advertising purchase decisions. It also calculates the efficiency of any particular advertising program generated. The System also generates a simplified rating system for each particular schedule that allows advertisers to make independent, accurate and informed decisions about their media advertising purchases. The present invention allows the direct advertiser to select the media outlets that reach its customers at the most efficient cost.

The System 100 generally has two types of users: the advertiser 101 and the media outlets 103. The System provides for the selection and purchase of advertising from five different types of advertising media: radio, television, cable, newspaper and outdoor. The System also allows the advertiser to use either System generated recommendations for media advertising, based on the advertiser's industry, or to select its own media advertising. The System provides a media selection tool that includes general information about each media type and industry. The System also includes an internal list of media outlets in the appropriate markets that is used to route System generated e-mail notifications and faxes to the respective media outlets. Throughout the selection and purchasing process, the System sends e-mail notifications to the appropriate individuals (advertisers and media outlet managers) when action is to be taken. If there is no e-mail address for a media outlet, a fax will automatically be sent notifying the media outlet that they have an action required on the system. A more detailed description of the process of the inventive media advertising selection and purchasing method and system is as follows.

Figure 2:
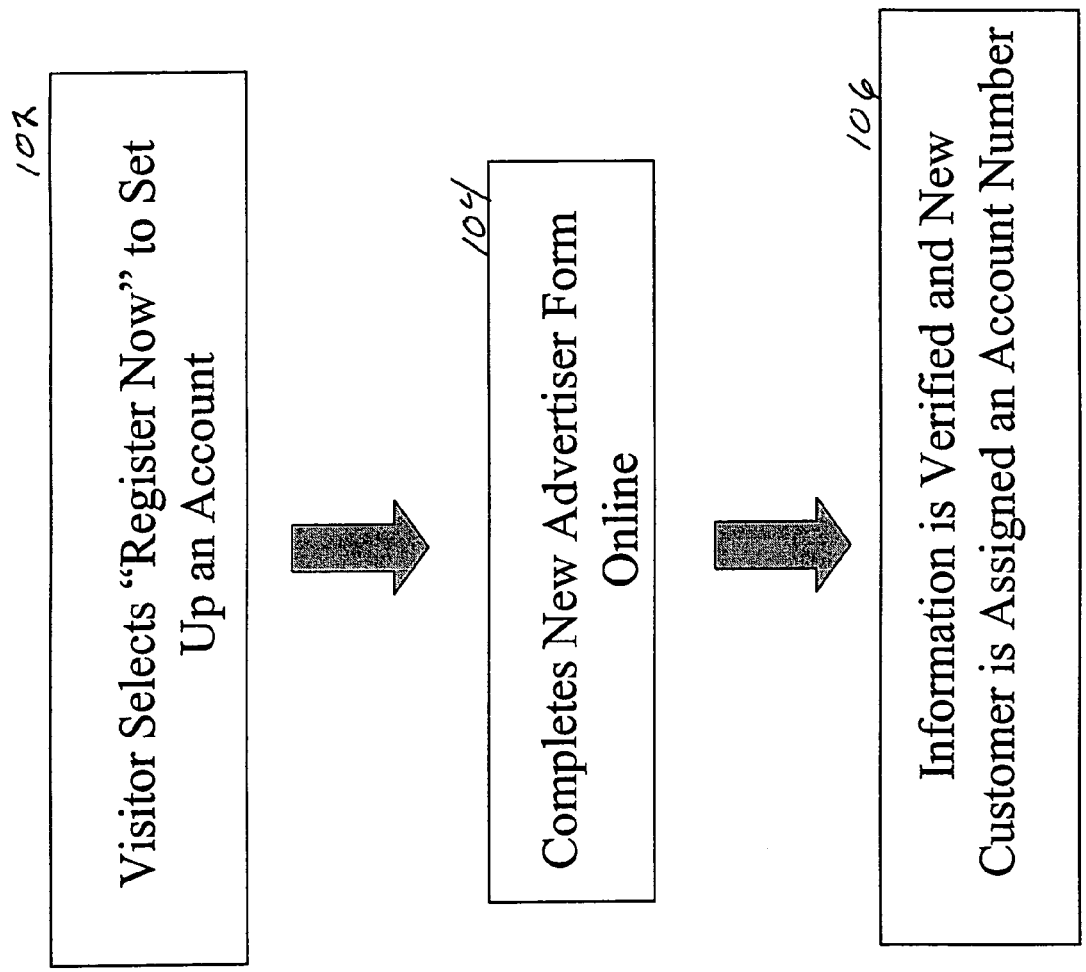
FIG. 2 is a flow diagram illustrating the routine to set up a new account.

In an order initiation step 105 (FIGS. 1 and 2), an advertiser accesses the Web site of the System 100 and sets up an account 102 by selecting the "Register Now" icon on the Web site home page. This brings up a New Advertiser form that is completed online 104. Required information generally includes company name, physical address, phone/fax numbers, e-mail address and contact name. Credit information is also requested. The advertiser provides a user name and password and upon verification of the required information, the System assigns an internal account number to the advertiser 106.

Figure 3:
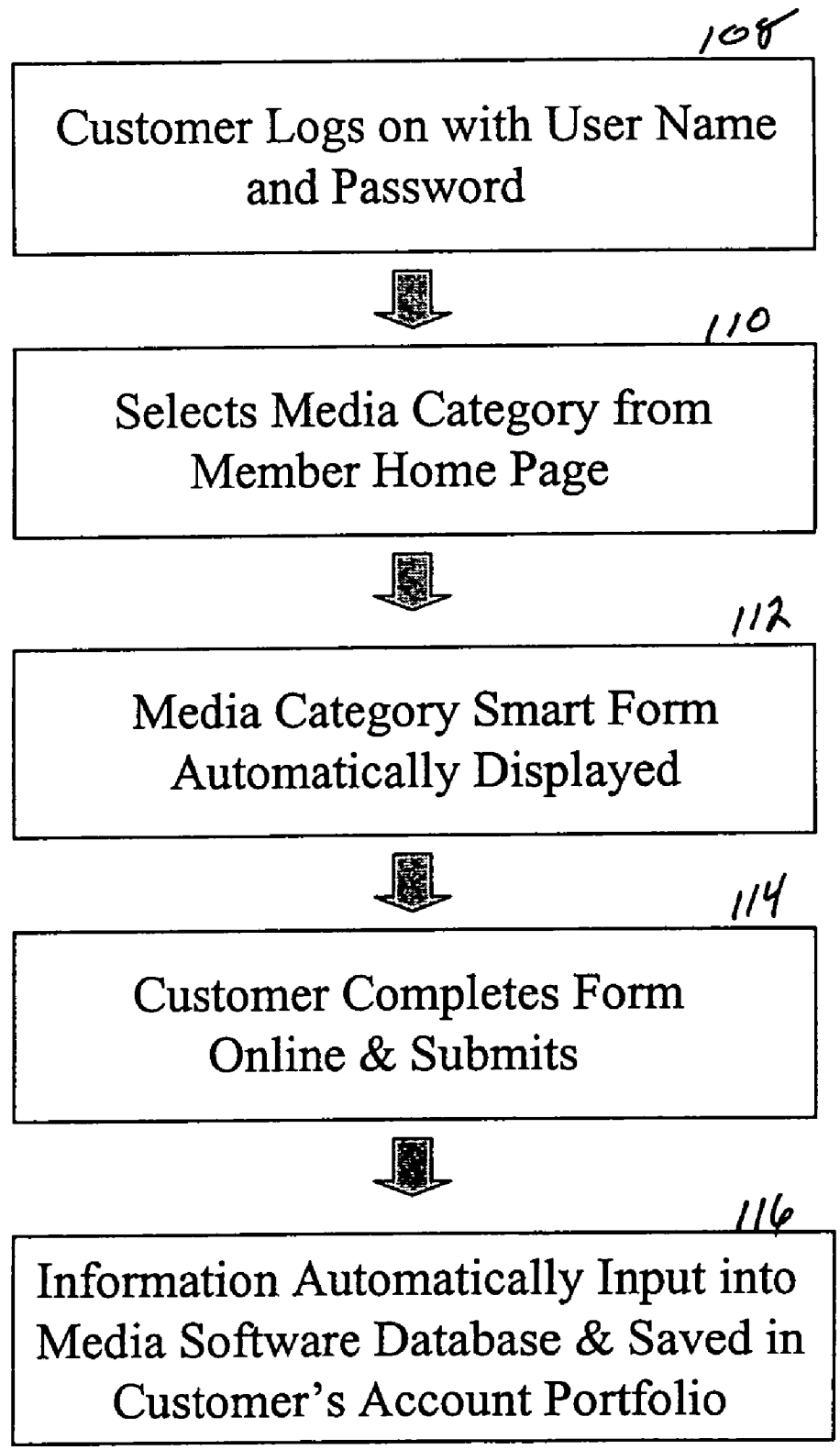
FIG. 3 is a flow diagram illustrating the routine for the order initiation.

If the advertiser has logged on previously, it will enter its log-in ID and password 108 (FIG. 3). The advertiser accesses the Member Home Page 110 and either chooses a specific advertising medium, i.e. radio, television, cable, outdoor, or newspaper or goes to a general media selection page that will help with the decision process. When the appropriate icons are selected (radio, television, cable, outdoor or newspaper), a Smart Form is displayed 112 (FIGS. 1 and 8A–D). The Smart Form illustrated in FIGS. A–D is an example only of the content that is generally found in a form of this type. It is not intended to be inclusive of the information contained in such a form.

At the next web page, the advertiser completes and submits a Smart Form (FIGS. 1 and 8A–D) to capture criteria based on the medium selected 114 (FIG. 3). The advertiser fills out the form(s) online with information regarding his type of advertising campaign, his customer profile, scheduling preferences (if any), target demographics, and allocated budget. Once the form is completed, the customer selects "Submit" and the information is automatically input into a media software database. If the media choice is broadcast media, a media software database such as TAPSCAN® or TVSCAN® or similar software is used 116 (FIG. 3). The customer can also select "Clear" to cancel the request or begin the process again. The System saves the Smart Form data for each category that the advertiser has entered. For future purchases, the advertiser can choose to use the same applications as previously used or it can choose to make changes to the Smart® Form.

Figure 4:
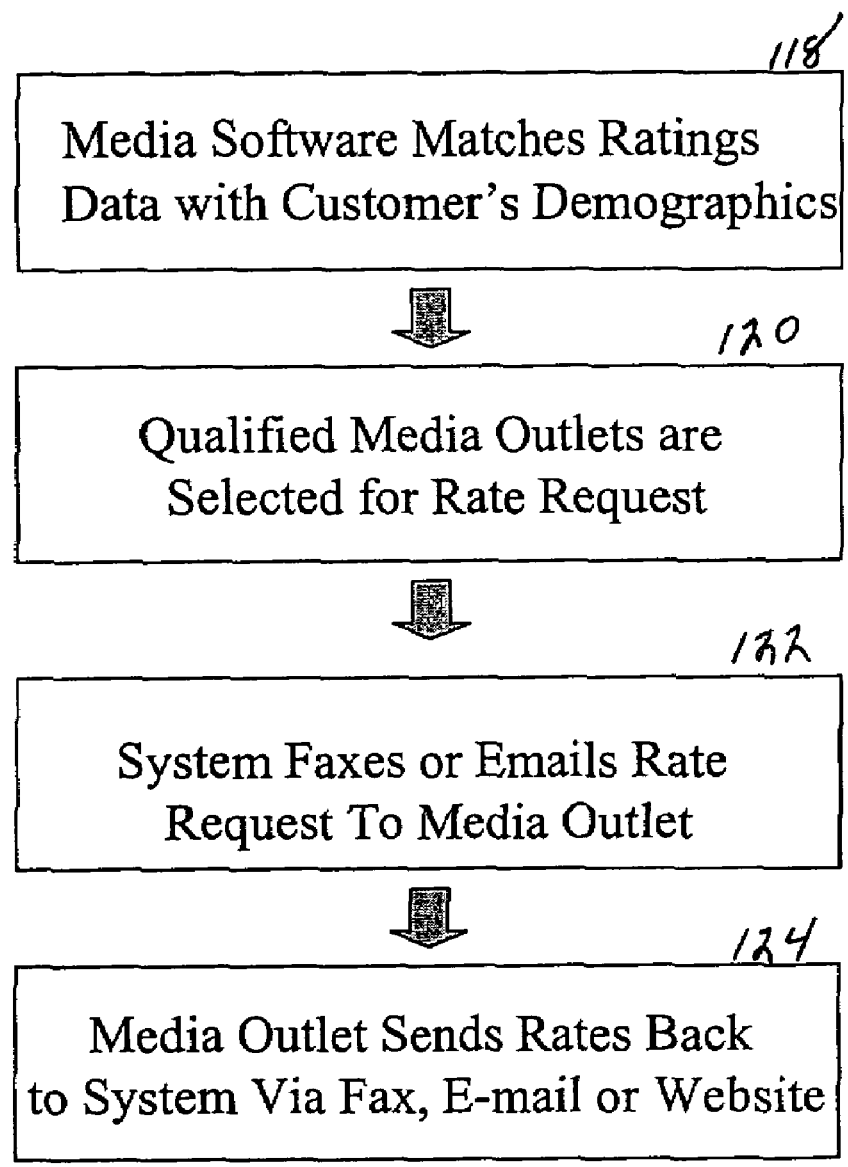
FIG. 4 is a flow diagram illustrating the routine for the outlet submission.

The System compiles the data from the Smart Form and generates a list of media outlets for submitting rate requests. As discussed above, for broadcast media selections, the System will take the information captured in the Smart Form and feed this information into media selection software such as TAPSCAN® or TVSCAN® or similar software in order to determine the most effective radio stations, television programs or cable networks for the advertiser's advertising purposes 118 (FIGS. 1 and 4). The list of cable networks, radio stations or television programs and AQH ratings is then fed into a second module of a software program that takes the list of networks and/or stations and rankings and selects out the top ranking networks and/or stations 120 (FIGS. 1 and 4). For newspaper and outdoor outlets, the appropriate newspaper or outdoor outlets are selected from an outdoor or newspaper advertising database maintained by the System. If desired, an advertiser can exclude media outlets from the rate requests list. If no media outlets are excluded, all appropriate media outlets in the advertiser's market (within the medium selected) will receive rate requests. From the Smart Form information, the System selects the media choices and requests rates from the appropriate media outlets 121 (FIG. 1).

The System generates an e-mail or facsimile that is sent to the selected media outlets with the rate request information 122 (FIG. 4). For example, with broadcast media such as radio, television and cable, the outlets will be given the following information with which to submit its rates: flight period, dayparts, days of week, excluded programming or stations, category of advertiser, respond by date information and comments.

In the outlet rate submission step 107 (FIG. 1), the media outlet receives an e-mail or a facsimile notification from the System Web site that rates have been requested 109 (FIG. 1). The media outlet personnel access the Web site in order to view the outstanding rate requests. The media outlet employee for each media outlet then goes to the rate submission page on the Web site, fills out the rate submission form and submits it to the System through the Web site 124 (FIGS. 1 and 4). The media outlet rate submission page is a secure page, only accessible by the media outlet personnel authorized to submit rates on behalf of its company.

Also, upon submitting rates to the System, the media outlet is agreeing to provide media advertising at the rate submitted. For outdoor media outlets, the appropriate outlet employee enters available locations and rates, and for the newspaper outlet, the appropriate outlet employee enters rate information.

Figure 5:
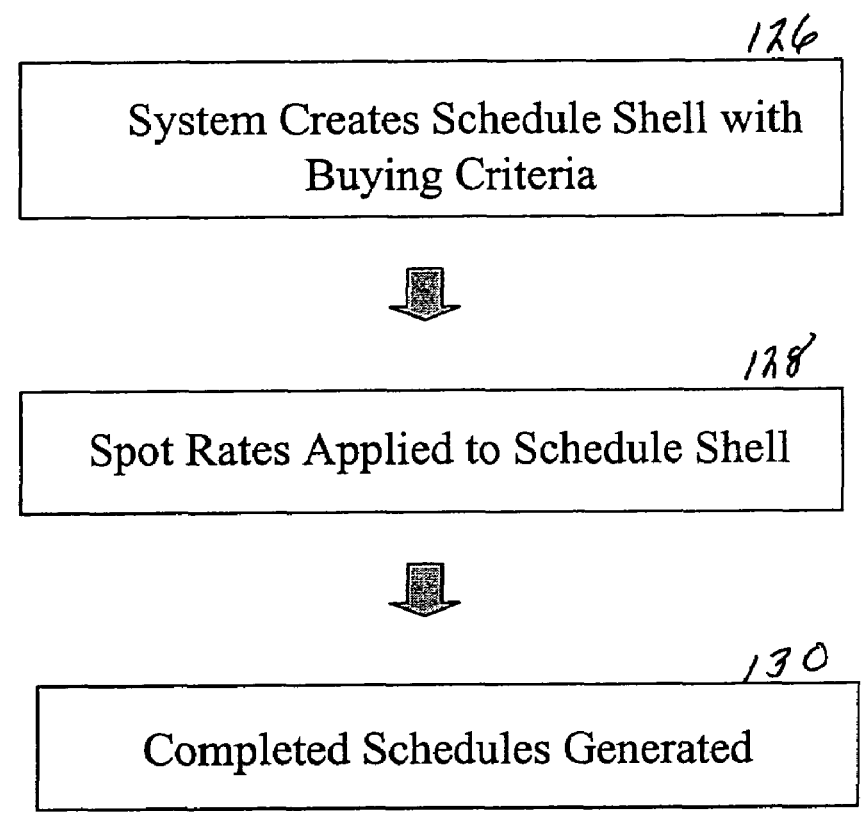
FIG. 5 is a flow diagram illustrating the routine for the schedule creation.

After the System receives the rate submission page from the media outlet, it creates a schedule using a media planning module that interfaces with audience ratings and qualitative data 123 (FIG. 1). In a preferred embodiment, the System creates a "shell" schedule that is based on buying criteria from the Smart Form that includes customer demographics, budget or number of units requested (newspaper and outdoor), and for broadcast media, frequency or reach levels, selected dayparts and flight dates (start and finish dates of schedule) 126 (FIG. 5). The rate information is then entered into media software such as TAPSCAN® or TVS-CAN® or similar software and schedules are generated based on the derived parameters 130 (FIG. 5).

Once the schedules are generated, the System converts the schedule to a simplified format and applies a simplified efficiency rating system to the schedule 125 (FIG. 1). The simplified rating methodology evaluates the performance of each schedule in reaching the advertiser's target customer and the degree of cost efficiency. Using the simplified methodology, the cost per point achieved by each schedule is matched with the market average 132 (FIG. 6). The difference, plus or minus, is converted to a percentage variance 134 (FIG. 6). The percentage of variance is applied and each schedule is assigned a numerical rating based on cost per point achieved relative to market average 136 (FIG. 6). Market average is assigned a 5.5 numerical rating (or 100%) based on a scale of 1–10. The scale moves in 1.0 increments (11.11% each) and achieved cost per point levels are pinpointed based on the percentage variation from the market average.

Figure 9:
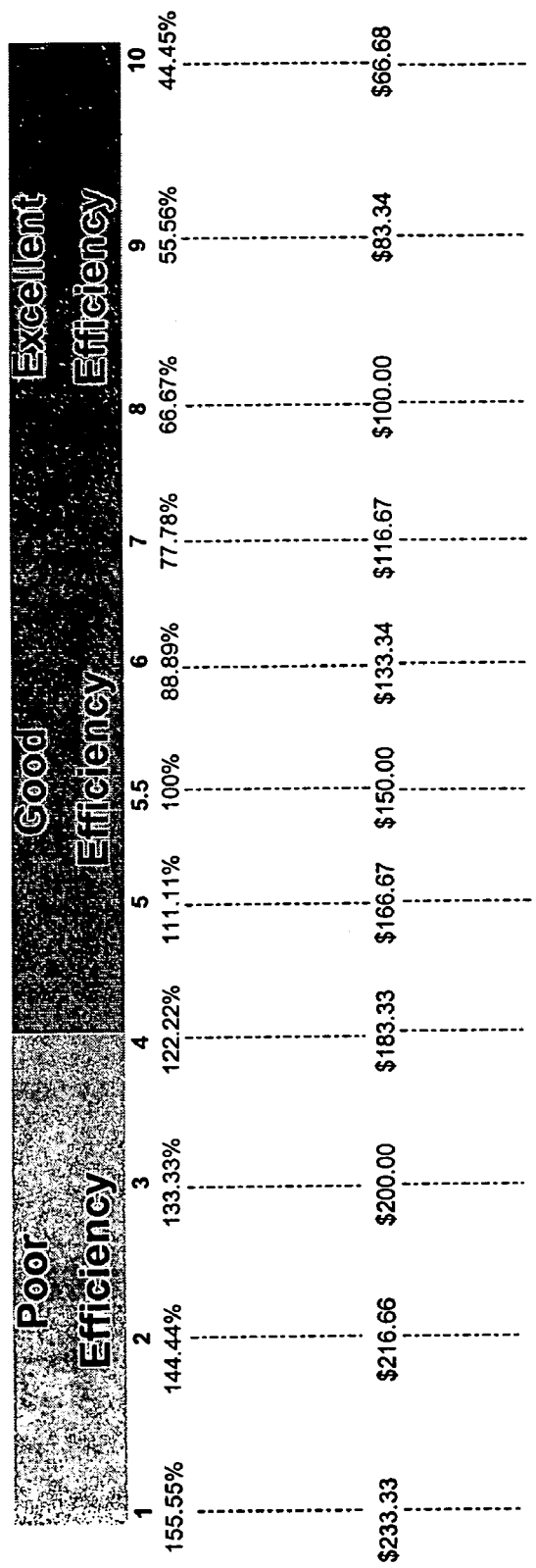
FIG. 9 illustrates a Simplified Rating System Chart for use with the subject invention.

The higher the cost per point from the market average, the less efficient the radio station, television station or cable networks are in reaching the target demographic; the lower the cost per point from the market average, the more efficient the radio station, television station or cable networks are in reaching the target demographic. For example, with a market average cost per point of $100, a $133 cost per point would be higher than average (inefficient) but a cost per point of $66 would be lower than average (efficient). Numerical ratings are identified by three categories, each representing 33.3% of the whole: Poor Efficiency, Good Efficiency, and Excellent Efficiency 138 (FIG. 6). The System then simplifies the schedules and produces a Simplified Rating System Chart that generally shows only flight dates, spot allocation, average unit cost, weekly cost and a total budget as illustrated in FIG. 9. Accompanying each schedule is the Simplified Rating System Chart that indicates the numerical rating and efficiency category that applies to the particular schedule 140 (FIG. 6).

Figure 7:
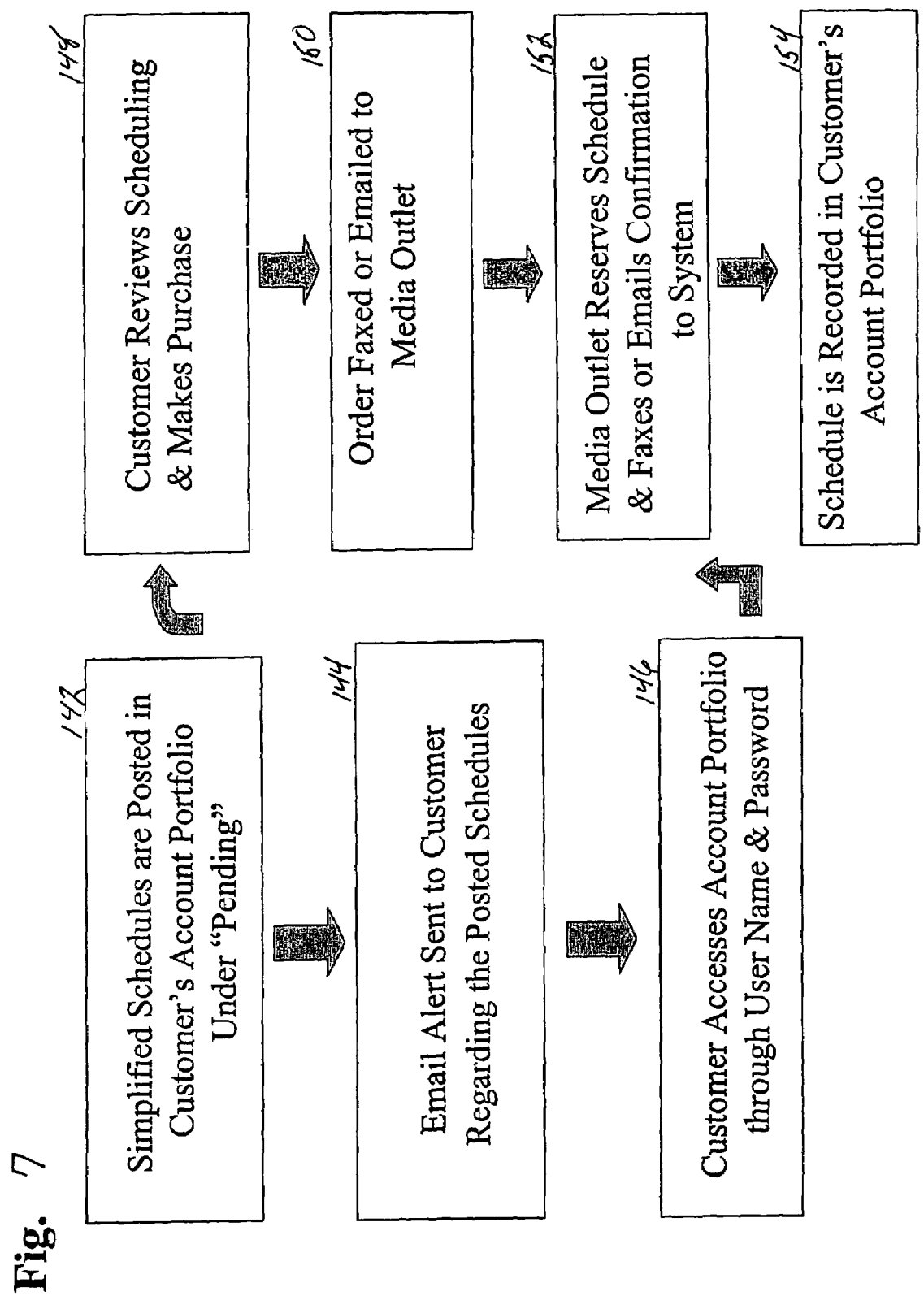
FIG. 7 is a flow diagram illustrating the routine for the advertiser schedule confirmation and media outlet schedule acceptance.

The schedule is analyzed to insure that certain reach and frequency thresholds are achieved. If the reach or frequency is too high, the schedule will be recalculated and the full budget may not be used. If the reach or frequency is too low, the advertiser will be notified that it must increase its budget or decrease its flight period (for broadcast media) in order to have an effective campaign. The schedules are submitted to the advertiser by posting them in the advertiser's account under "Pending" along with the validation dates of the rates 142 (FIGS. 1 and 7). The advertiser is notified via e-mail that its account contains posted schedules 144 (FIG. 7). The advertiser is notified only when all media outlets have submitted their rates or when a specified time period has expired. In a preferred embodiment, the e-mail to the advertiser contains a link to the Web site.

In the advertiser's schedule confirmation step 111 (FIG. 1), the advertiser logs on to the System Web site after receiving an order notification and accesses its account portfolio through its user name and password 146 (FIG. 7). The advertiser evaluates the proposed order(s) that has been developed and presented. As an example, for broadcast media the order contains the proposed advertising schedules, for outdoor media the proposed location and rates, and for newspaper advertising the proposed rates. Based on the advertiser's budget and System recommendation, the advertiser chooses the advertising campaign it feels is the most effective. The campaign can include only one of the five different types of advertising medium: radio, television, cable, newspaper and outdoor, or any combination of the five. The advertiser views a summary screen of all of its advertising selections and selects the "Purchase" icon for each desired schedule 148 (FIG. 7).

When the schedule is selected by the advertiser, it is agreeing to pay the selected media outlets for the submitted schedules and rates. In a preferred embodiment, the System allows the advertiser to select whether it will provide its own creative services, it will be utilizing the creative services of the media outlet or it will use the creative services available on the System Web site. After the advertiser has chosen its advertising schedules, the System records the purchase and submits the order to the media outlets 149 (FIG. 1). The System sends an e-mail or facsimile to the media outlets in the advertising campaign requesting final rate and schedule approval 150 (FIG. 7). Preferably, the e-mail information sent to the media outlets includes a final advertising schedule, the advertiser's contact and credit information or credit reference and the creative service option selected by the advertiser.

In the outlet schedule acceptance step 113 (FIG. 1), after notification by e-mail or fax of the accepted order, the media outlet personnel logs into the System Web site, in order to review all outstanding orders. The order acceptance page is accessed, the media advertising schedule is reserved and the media outlet e-mails a confirmation back to the System 152 (FIGS. 1 and 7). In a preferred embodiment, the media outlet personnel can accept the order or accept the order with credit restrictions, if they did not have credit information on the advertiser when they submitted their rates. When the System receives confirmation of the order from the media outlet, it sends an e-mail notification to both the advertiser and the media outlet notifying them of the confirmed media purchase. Although each e-mail contains basically the same information, the specific e-mails to the advertiser and media outlet will contain specific information pertaining to each of their respective next steps in the process. The e-mail generally includes information relating to the final schedule, contact information, final rate and credit restrictions, if any. If the schedule is accepted with restrictions by the media outlet, the System sends an e-mail notification to the advertiser that restrictions were placed on the schedule based upon its credit status. The advertiser accesses the Web site and accepts or rejects the credit restrictions. If rejected, the process stops. If accepted, the schedule is recorded in the advertiser's account portfolio 154 (FIG. 7) and the process continues in which the media outlets run the advertising schedules, and bill the advertiser for the media advertising purchase.

The subject invention provides a method and system for selecting and purchasing traditional media advertising over the Internet. It also provides a method by which direct advertisers can access technical and analytical data that has been converted to a simplified rating system thus allowing them to make independent, accurate and informed decisions about their media purchases.

One skilled in the art will readily appreciate that the present invention is well adapted to carry out the objects and obtain the ends and advantages mentioned as well as those inherent therein. The method and system for selecting and purchasing media advertising over the Internet as described herein is presently representative of the preferred embodiments, is exemplary and is not intended as limitations on the scope of the invention. Changes therein and other uses will occur to those skilled in the art which are encompassed within the spirit of the invention and are defined by the scope of the claims

What is claimed is:

1. A method of providing media advertising to a user, comprising the steps of:
   receiving media advertising information from the user;
   processing the media advertising information to select one or more media outlets;
   creating a media advertising rate request directed to the media outlet;
   transmitting the media advertising rate request to the media outlet for processing;
   receiving a processed rate request from the media outlet;
   creating a media advertising schedule based on the processed rate request wherein the media advertising schedule is presented in a simplified format by applying a rating system to the media advertising schedule and creating numerical ratings and efficiency categories for the media advertising schedule;
   transmitting the media advertising schedule to the user;
   receiving a media advertising purchase decision from the user; and
   transmitting the media advertising purchase decision to the media outlet.

2. The method of claim 1, wherein the media advertising is radio advertising.

3. The method of claim 1, wherein the media advertising information comprises advertising campaign type information.

4. The method of claim 1, wherein the media advertising information comprises media choice information.

5. The method of claim 1, wherein the media advertising information comprises customer profile information.

6. The method of claim 1, wherein the media advertising information comprises scheduling preference information.

7. The method of claim 1, wherein the media advertising information comprises target demographic information.

8. The method of claim 1, wherein the media advertising information comprises allocated budget information.

9. The method of claim 1, wherein the processed rate request comprises information selected from the group consisting of flight period, dayparts, days of the week, excluded programming, excluded stations, category of advertiser, respond by date information, locations, and comments.

10. The method of claim 1, wherein the step of creating a media advertising rate request further comprises the steps of:
    creating a shell schedule based on a buying criterion; and,
    interfacing the shell schedule with audience rating data.

11. The method of claim 1, wherein the step of processing comprises the selection of one media outlet.

12. The method of claim 1, wherein the step of processing comprises the selection of two or more media outlets.

13. A method of providing radio advertising based on a request from a user over the Internet, comprising the steps of:
    receiving radio advertising information over the Internet from the user wherein the radio advertising information comprises a buying criterion;
    processing the radio advertising information to select one or more radio stations;
    creating a shell schedule based on the buying criterion;
    receiving radio advertising rates from the one or more radio stations;
    interfacing the shell schedule with audience rating data, thereby creating an interfaced shell schedule;
    creating a radio advertising schedule based on the radio advertising rates and the interfaced shell schedule;
    optimizing the radio advertising schedule based on the processed rate request to create an optimized radio advertising schedule wherein the optimized radio advertising schedule is presented in a simplified format by applying a rating system to the radio advertising schedule and creating numerical ratings and efficiency categories for the radio advertising schedule;
    transmitting the optimized radio advertising schedule to the user;
    receiving a radio advertising purchase decision from the user; and,
    transmitting the radio advertising purchase decision to the one or more radio stations.

14. The method of claim 13, wherein the step of processing comprises the selection of one radio station.

15. The method of claim 13, wherein the step of processing comprises the selection of two or more stations.

* * * * *